2 Sheets--Sheet 1.

W. WEYHE.
Rotary Engine.

No. 165,772.  Patented July 20, 1875.

Witnesses:
Geo. R. Brown
W. A. Brigden

Inventor:
Wilhelm Weyhe
Per Abbett & Fuller
Attorneys.

W. WEYHE.
Rotary Engine.

No. 165,772.  Patented July 20, 1875.

Witnesses:
Geo. R. Brown
W. A. Brigden

Inventor:
Wilhelm Weyhe
per Abbett & Fuller
Attorneys

UNITED STATES PATENT OFFICE.

WILHELM WEYHE, OF BREMEN, GERMANY.

IMPROVEMENT IN ROTARY ENGINES.

Specification forming part of Letters Patent No. 165,772, dated July 20, 1875; application filed July 3, 1875.

*To all whom it may concern:*

Be it known that I, WILHELM WEYHE, of Bremen, Germany, have invented a certain Improvement in Rotary Engines, of which the following is a specification:

My improvement relates to that class of rotary engines in which the piston is affixed to the periphery of a disk mounted upon the shaft, and revolves in an annular cylinder, and acts as a cam in opening the gate-valve to make a passage for itself through the part of the cylinder which the gate-valve occupies when closed; and my invention consists, first, in the peculiar shape of my piston, which is an elongated grooved wedge, curving to conform to the annular cylinder, and having a concave base. The cavity of the base and the groove in the wedge are alike intended to present surfaces which make a close engagement with the curved inner end of the gate-valve as the latter is forced out by the movement of the piston, and returned to its seat by the action of a spring.

By reason of the peculiar shape of my piston, it has a long bearing upon the walls of the cylinder, and closes the induction-port while it is opening the gate-valve, and allows the gate-valve to close before the induction-port is again opened.

Secondly, my invention includes a novel mode of packing my piston, which consists in coiling spirally around the piston a light steel spring, the several convolutions of which bear outwardly against the walls of the cylinder, and, under the effect of the pressure which drives the piston, form a tight joint therewith, the face of the piston being perforated to admit steam inside the coiled spring.

A third feature of my invention consists in the use of a pivoted gate-valve, which is held upon its seat by an external spring, and is affixed to a flat lever, which projects into the annular cylinder, and presents a bearing to engage the piston and facilitate its action as a cam upon the gate-valve.

Figure 1:
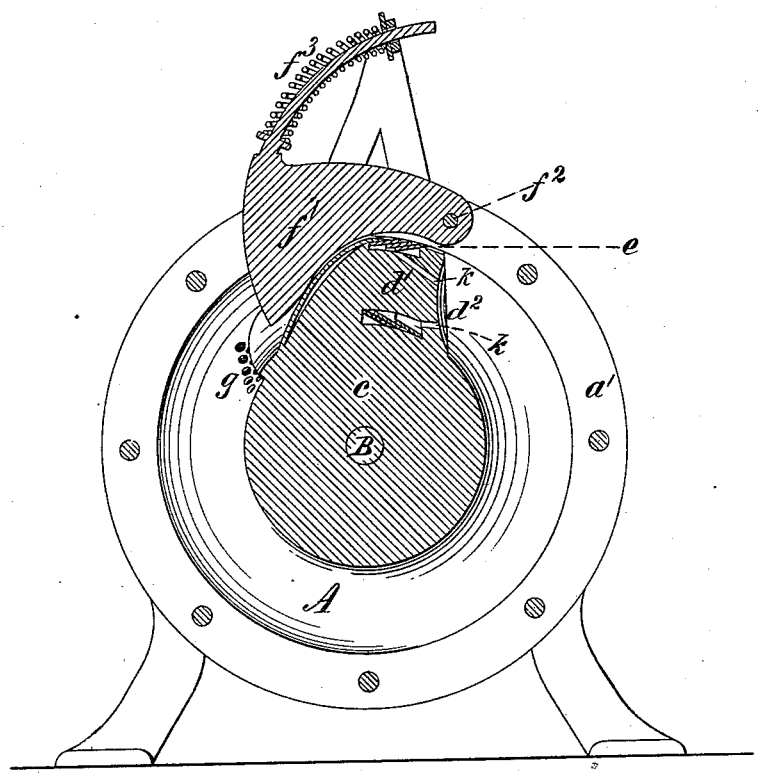
Figure 2:
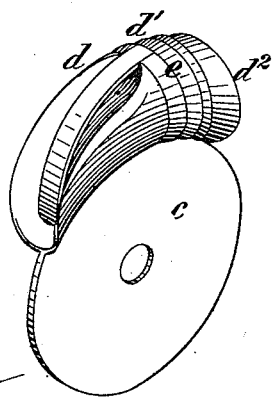
Figure 3:
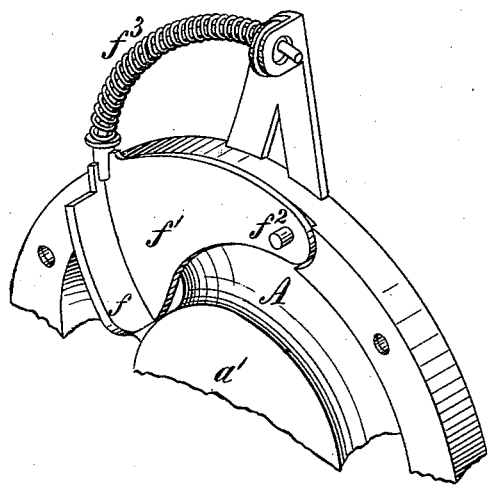
Figure 4:
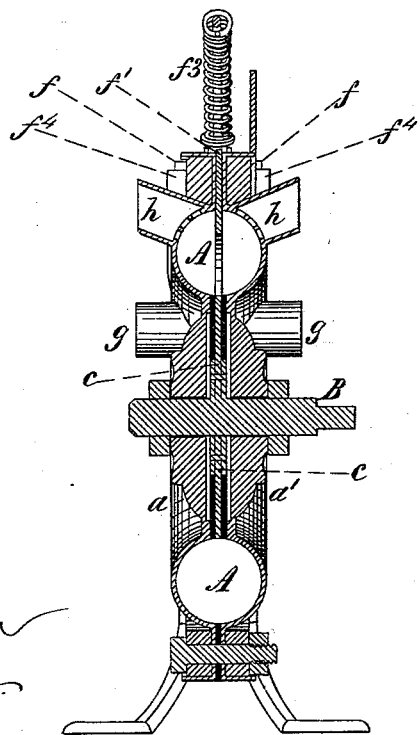

The accompanying drawings are as follows: Figure 1 is a section of my rotary engine through the center of the cylinder, showing the gate-valve partially raised by the piston, and the induction-port nearly closed. Fig. 2 is a perspective view of my piston, showing the central disk to which it is attached. Fig. 3 is a perspective view of my pivoted gate-valve. Fig. 4 is a longitudinal section through the shaft of the engine and cylinder, &c.

Referring to the drawings, A represents my annular cylinder, formed by the bolting together of two annularly-recessed disks, $a\ a'$. The shaft B has its bearings in the center of the disks $a\ a'$, and is keyed to the central disk $c$, to the periphery of which the piston $d$ is affixed. The piston, $d$, is a curved cylinder, $d^1$, around which is coiled the spiral spring $e$. The piston conforms to the curve of the annular cylinder, and has a concave face, $d^2$, in the rear, which stands obliquely across the cylinder. In front of its cylindrical part the piston is elongated in the form of a curved wedge. The lower part of the wedge fits the wall of the cylinder, and the upper curved surface of the wedge fits the inner edge of the gate-valve $f$. This gate-valve is affixed to the metal plate $f^1$, which is pivoted at $f^2$, and held upon its seat by the spiral spring $f^3$. The inner edge of the gate-valve is rounded to correspond to the shape of the cylinder, and is packed in a curved seat $f^4$, the curved seat being an arc of the circle formed by the sweep of the gate-valve in its movement upon the pivot $f^2$. The induction opening or port $g$ is arranged a short distance in front of the gate-valve, and the eduction-port $h$ immediately behind it.

The operation of my engine is as follows: The gate-valve being closed, the steam or other fluid, being injected, under pressure, through the induction-port $g$, expands in the cylinder between the front of the gate-valve and the face of the piston, and forces the piston around the annular cylinder. When the piston reaches the gate-valve, the thin forward edge of the piston engages the under edge of the gate-valve and wedges it upward. As the gate-valve rises, the wedge overlaps the induction-port, and finally completely closes it. The momentum of the piston carries it by the gate-valve, which is thrown back upon its seat by the action of the spiral spring, before the induction-port is again opened. The face of the piston is concave, to furnish a bearing for the round under edge of the gate-valve, and is slightly oblique so as to let the valve down easy. The momentum of the piston having carried it by the induction-port, steam or other fluid, under pressue, is again admitted, and acts upon the piston to enforce its continued revolution.

It will be seen that the coiled-spring packing presents, as it were, a series of cones, and the effect of the pressure in the cylinder is to expand the steel spring against the walls of the cylinder, so that it acts like cup-packing, and tightly packs the piston. To insure the expansion of the spring, the face of the piston is perforated by the holes $k\,k\,k\,k$, which admit steam to the annular space inside the coils of the spring.

I claim as my invention, in a rotary engine—

1. The combination of the pivoted gate-valve $f$ with the elongated grooved piston, substantially as and for the purposes set forth.

2. The combination of the coiled spring $e$ with the piston $d$, provided with the perforations $k\,k\,k\,k$ in its face, substantially as and for the purpose described.

The above specification of my invention signed by me this 23d day of April, 1875.

WILHELM WEYHE.

Witnesses:
C. H. AHRBECK,
J. R. BUNDSACK.